US009153945B2

(12) United States Patent
Hofmann et al.

(10) Patent No.: US 9,153,945 B2
(45) Date of Patent: Oct. 6, 2015

(54) FRAME PIECE FOR A RACK

(75) Inventors: Wilfried Hofmann, Munich (DE); Simon Jocham, Munich (DE); Igor Harry Schaaf, Rheinmuenster (DE); Paul Mazura, Karlsbad (DE); Manfred Hellwig, Bad Homburg V.D. Hoehe (DE); Walter Nicolai, Buseck (DE)

(73) Assignee: C E S Control Enclosure Systems Gmbh, Bad Homburg V.D. Hoehe (DE)

( * ) Notice: Subject to any disclaimer, the term of this patent is extended or adjusted under 35 U.S.C. 154(b) by 0 days.

(21) Appl. No.: 13/819,536

(22) PCT Filed: Aug. 26, 2011

(86) PCT No.: PCT/EP2011/004287
§ 371 (c)(1),
(2), (4) Date: Aug. 7, 2013

(87) PCT Pub. No.: WO2012/031696
PCT Pub. Date: Mar. 15, 2012

(65) Prior Publication Data
US 2013/0306584 A1    Nov. 21, 2013

(30) Foreign Application Priority Data
Aug. 30, 2010   (DE) .......................... 10 2010 035 792

(51) Int. Cl.
*H02B 1/01*    (2006.01)
(52) U.S. Cl.
CPC . *H02B 1/01* (2013.01); *H02B 1/013* (2013.01)
(58) Field of Classification Search
CPC ............ H02B 1/01; H02B 1/014; H02B 1/30; H02B 1/013; H02B 1/301; H02B 1/012; H05K 7/183; H05K 7/186

USPC ................. 211/26, 183; 312/265.1–265.6
See application file for complete search history.

(56) References Cited

U.S. PATENT DOCUMENTS

| 282,483 | A | * | 8/1883 | Baker | .............................. 217/65 |
| 436,149 | A | * | 9/1890 | Overgaard | .................. 217/12 R |

(Continued)

FOREIGN PATENT DOCUMENTS

| DE | 33 44 598 C1 | 9/1984 | |
| DE | 4013371 C1 * | 7/1991 | ................ F16B 9/02 |

(Continued)

OTHER PUBLICATIONS

International Search Report issued in corresponding application No. PCT/EP2011/004287 mailed Apr. 16, 2012.

(Continued)

*Primary Examiner* — Patrick Hawn
(74) *Attorney, Agent, or Firm* — Carter, DeLuca, Farrell & Schmidt, LLP

(57)    ABSTRACT

The present disclosure relates to a frame piece for a rack, comprising a hollow profile which extends along its longitudinal axis and is brought into its cylindrical profile shape by shaping a substantially flat starting material. The hollow profile on two opposite lateral edges, has a connecting zone for closing the hollow profile at least one tab-type projection being formed on at least one of the lateral edges, said projection extending away from the lateral edge of the hollow profile and being shaped such that it can be brought into engagement with at least one corresponding receptacle on the respective other lateral edge in a clamping or positive manner.

7 Claims, 7 Drawing Sheets

(56) References Cited

U.S. PATENT DOCUMENTS

| | | | |
|---|---|---|---|
| 3,836,217 A * | 9/1974 | Shiina | 312/107 |
| 4,643,319 A * | 2/1987 | Debus et al. | 211/189 |
| 5,749,476 A | 5/1998 | Besserer et al. | |
| 5,769,519 A * | 6/1998 | Nicolai | 312/351.1 |
| 5,984,566 A * | 11/1999 | Blaha | 403/364 |
| 5,992,646 A * | 11/1999 | Benner et al. | 211/26 |
| 6,149,255 A * | 11/2000 | Benner et al. | 312/265.4 |
| 6,231,142 B1 * | 5/2001 | Pochet | 312/265.3 |
| 6,357,194 B1 * | 3/2002 | Jones, Jr. | 52/590.1 |
| 6,591,997 B2 * | 7/2003 | Hung | 211/183 |
| 6,615,998 B2 * | 9/2003 | Klassen et al. | 211/183 |
| 6,808,240 B2 * | 10/2004 | Altena | 312/265.4 |
| 6,915,616 B2 * | 7/2005 | Fontana et al. | 52/844 |
| 6,974,036 B2 * | 12/2005 | Wyatt et al. | 211/26 |
| 7,086,707 B2 * | 8/2006 | Wyatt et al. | 312/265.4 |
| 7,797,890 B2 * | 9/2010 | Thrush et al. | 52/177 |
| 8,225,945 B2 * | 7/2012 | Fan | 211/26 |
| 2004/0004418 A1 * | 1/2004 | Wyatt et al. | 312/265.1 |
| 2004/0016713 A1 * | 1/2004 | Wyatt et al. | 211/183 |
| 2007/0175648 A1 * | 8/2007 | Francisquini | 174/50 |
| 2010/0178455 A1 * | 7/2010 | Shen | 428/134 |

FOREIGN PATENT DOCUMENTS

| | | |
|---|---|---|
| DE | 195 36 904 C1 | 11/1996 |
| DE | 198 45 169 C1 | 5/2000 |
| EP | 1 094 695 A1 | 4/2001 |
| JP | 19980057171 | 9/1999 |
| JP | 19990075947 | 9/2000 |
| JP | 2002079333 A | 3/2002 |
| JP | 2009195986 A | 9/2009 |
| WO | 9511539 A1 | 4/1995 |
| WO | WO 2007062482 A1 * | 6/2007 |

OTHER PUBLICATIONS

Japanese Office Action dated Feb. 24, 2015, issued in Japanese Appln. No. 2013526348.

* cited by examiner

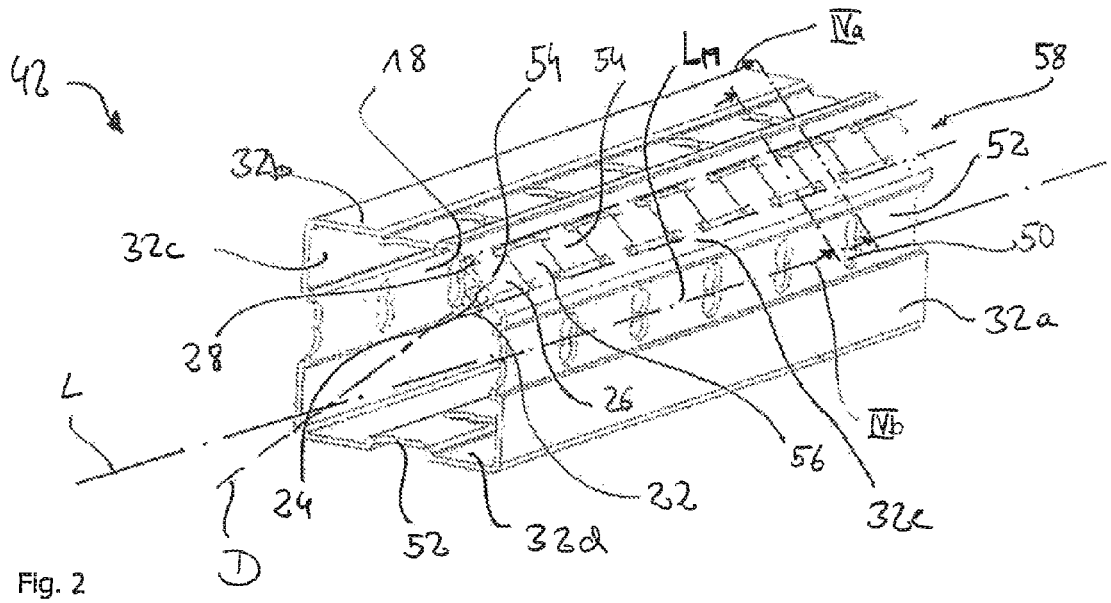
Fig. 2
FIG 3
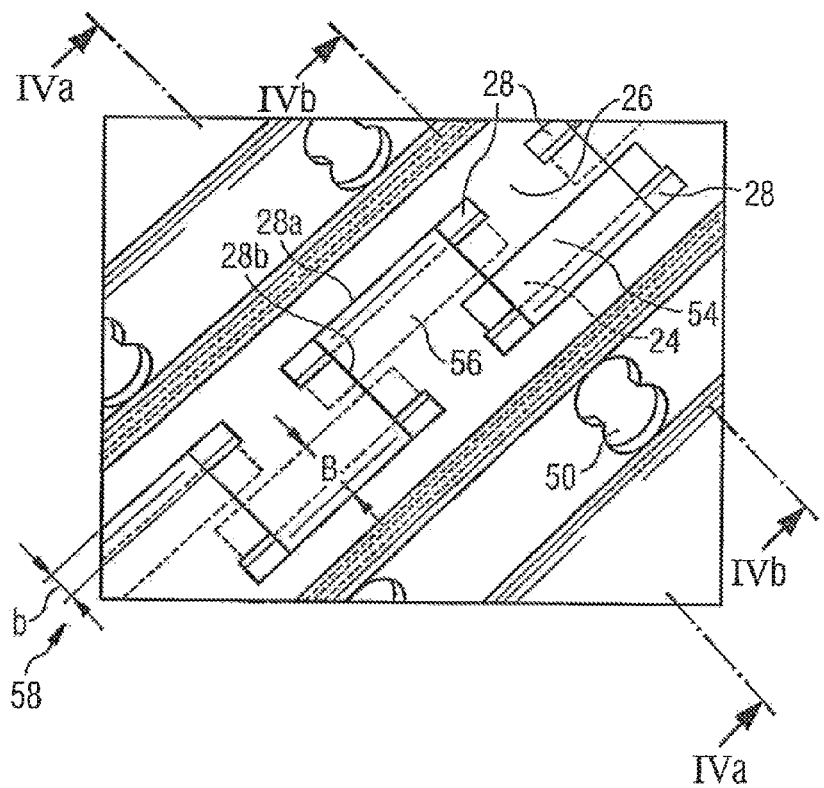

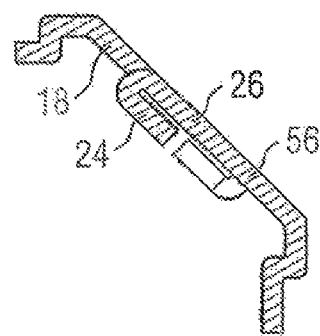
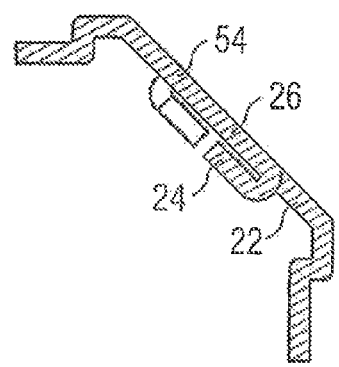
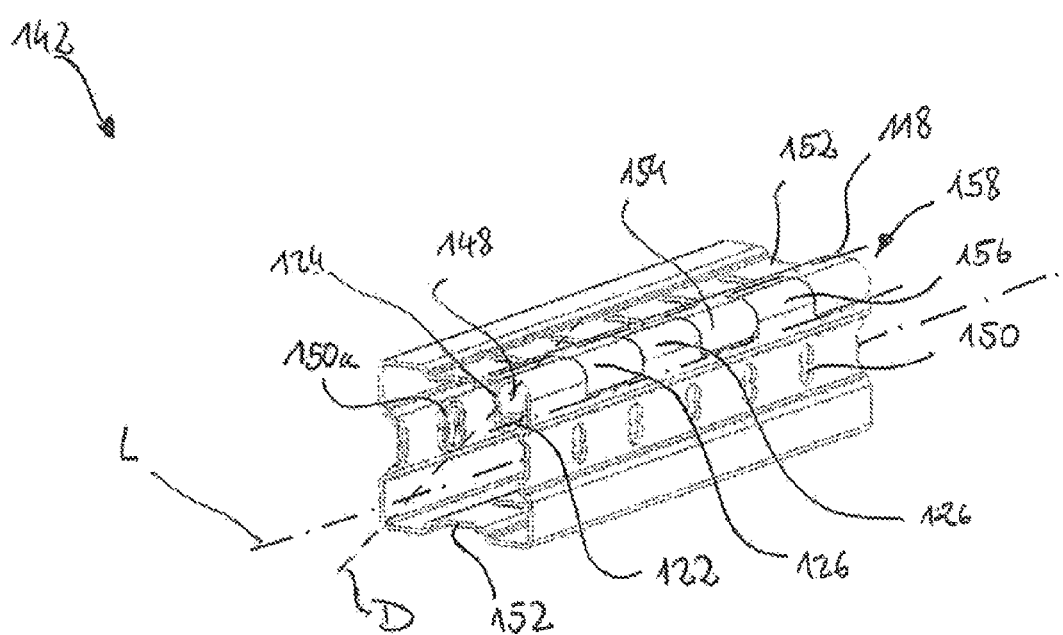
Fig. 5

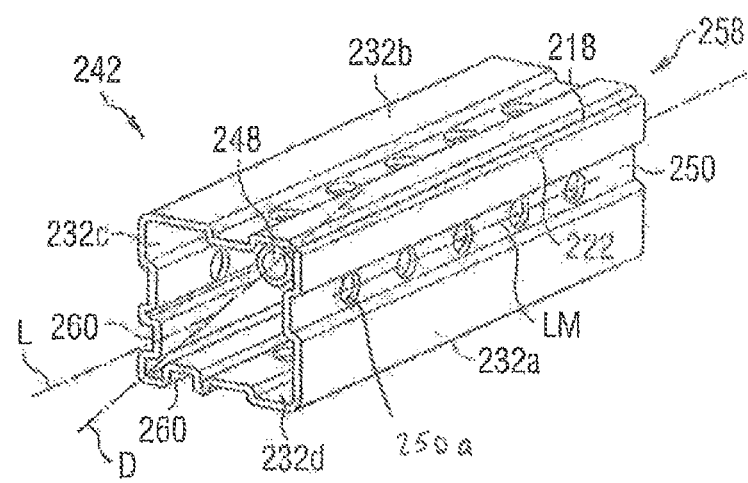
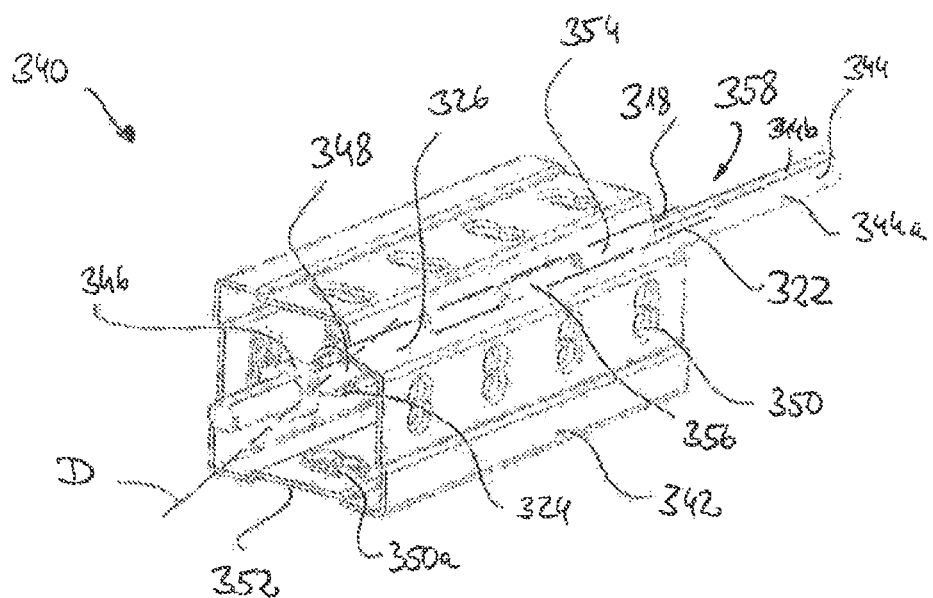

FRAME PIECE FOR A RACK

The present invention relates to a frame piece for a rack, in particular for a rack which forms a frame for a switchgear cabinet, the frame piece having a hollow profile which extends along its longitudinal axis and is brought into a cylindrical profile shape by shaping a substantially flat starting material, and the hollow profile, on two opposite lateral edges, having a connecting region for closing the hollow profile. The term "rack" here means supporting structures, such as, for example, those used in furniture making and in particular shelf making, but also other supporting structures, for example machine base frames, supporting frames for enclosures, etc.

The switchgear cabinets already mentioned serve in general for housing electrical and electronic components of a process plant, a machine tool or a production facility etc., which are not located directly in or on the machine (e.g. sensors). Different requirements have to be met by the switchgear cabinet, depending on the type of components to be installed. For instance, with regard to the components to be installed in the interior, it may be required that the switchgear cabinet protects these components from dust and water (degree of protection, IP protection classes according to DIN EN 60529), from overheating (switchgear cabinet air conditioning), from electromagnetic influence (EMC) and/or from mechanical influences, vandalism and earthquakes (cabinets with additional struts). Furthermore, a switchgear cabinet may serve for supporting and structuring the inner structure (e.g. with the aid of supporting rails or mounting plates for subdividing into power and control regions).

In addition, however, the switchgear cabinet also enables protection for the outside environment by providing, for example, shielding of electromagnetic emissions of the installed components, protection against dangerous voltages (protection classes: protective earthing or protective insulation) and/or, if necessary, fire protection (special solutions for smoke extraction systems).

Usually, switchgear cabinets are composed in principle of a rack, and wall and door elements attachable thereto. Depending on the desired use and the resulting requirements to be met by the switchgear cabinet, the rack and the elements attachable thereto may be manufactured from different materials and/or with different coatings. Hollow profiles are generally used for the rack.

The longitudinal axis of a hollow profile can in this case be the central longitudinal axis of the hollow profile which coincides with the central longitudinal axis of the frame piece, or any longitudinal axis running parallel thereto.

Such hollow profiles are well known from the prior art. Thus, for example, the document DE 195 36 904 C1 discloses a switchgear cabinet having a rack, the frame pieces of which are joined together in their connecting region to form a closed profile by means of a weld seam running in the longitudinal direction of the hollow profile.

The provision of a weld seam for forming the shaped starting material into a closed hollow profile may, however, be disadvantageous for several reasons. For instance, it is known that during welding a material bonding is achieved between the parts to be connected in that the material of the parts to be connected is intensely heated by local heat input, in order to cause this material to melt in the region of the weld seam. However, this may result in a thermal distortion due to thermal stresses which are introduced and a structural change of the material structure in the region of the weld seam. In the case of a hollow profile of a frame piece, this has the result, inter alia, that additional reworking steps may possibly be required to realign the hollow profile and bring it into the desired shape.

A further disadvantage of the welding as the joining method for closing a hollow profile is its influence on surface coatings which may be deposited on the material of the hollow profile. Surface coatings may be used to improve the electrical conductivity of the components of the switchgear cabinet, for example in a desired use of the switchgear cabinet for shielding electromagnetic emissions of the installed components to the outside and for protecting the installed components from electromagnetic influence (EMC), or for avoiding corrosion (e.g. non-metallic coatings made of plastic or metallic coatings with zinc). Particularly favourably, the flat, plate-shaped starting material of the hollow profiles is provided with a coating, since its application is simplified by the flat shape of the starting material, or the starting material is bought as already coated material.

However, the welding process for closing the hollow profile produces burn-off in the region of the weld seam, which locally destroys the coating of the hollow profile and thus may impair the desired electrical conductivity and/or the corrosion resistance of the frame piece. Furthermore, some coatings may adversely affect the welding process, making it necessary to do without a coating of the components to be connected, prior to the welding process. Thus, the welding of the hollow profiles involves increased cost and time if the welded hollow profiles have to be provided with an appropriate coating subsequently.

Mention should be made, as disadvantages of the welding for closing the hollow profiles, not least of the high energy requirement and the costly protective measures for the welding personnel.

Alternatively, it is known from the prior art to provide open hollow profiles, as disclosed, for example, in the document DE 43 36 204 C2, instead of a closed welded hollow profile for a frame piece. In the solution shown therein, the frame pieces of the supporting framework are bent as simple bending parts from a sheet metal blank and form an inwardly directed, open hollow profile, the profile side portions of which serve as a receptacle for mounting rails. The open hollow profiles, which have a lower rigidity and bending strength than closed hollow profiles owing to their design, are stabilized by the mounting rails connected to them. It also emerges from the document DE 43 36 204 C2 that the mounting rails may be welded to the hollow profiles. Alternatively, a connection is possible using screws or rivets.

The document DE 43 36 187 C2 also discloses the possibility of forming frame pieces for a rack of a switchgear cabinet as open hollow profiles which again are connected to corresponding mounting rails and are thereby stiffened. The connection between the mounting rails and the hollow profiles of the frame pieces may be realised such that the mounting rails are directly screwed to corresponding profile portions of the open hollow profile or fixed, by means of a clamp or a clamping screw, in the receptacle formed by the profile portions of the open hollow profile.

Clearly, attaching additional mounting rails results in an increased effort of assembly and hence increased assembly costs. Furthermore, additional parts have to be produced and provided, which likewise results in increased costs in terms of production and storage of the rack components. Finally, the additional mounting rails also increase the total weight of the switchgear cabinet. This is disadvantageous in particular when transporting the switchgear cabinet.

The object of the present invention is to provide a hollow profile of a frame piece for a rack, which on the one hand has sufficient stability and bending strength and on the other hand can be produced as quickly and simply as possible.

This and other objects are achieved according to a first aspect by a frame piece for a rack having the features described at the outset, in which according to the invention furthermore at least one tab-like projection is formed on at least one lateral edge, which projection extends outwards from the lateral edge of the hollow profile and is shaped such that it can be brought into engagement with at least one corresponding receptacle on the respectively other lateral edge in a clamping or positive locking manner.

In contrast to a customary welding process for closing the hollow profile by means of material bonding, according to the invention local heating of the hollow profile is dispensed with, thus eliminating a thermal distortion and necessary reworking steps associated therewith. Since the hollow profile itself provides means for closing the profile in the form of the at least one projection and the corresponding receptacle, it is possible to dispense with the production and provision of additional parts, such as, for example, screws or rivets, so that a simplified assembly is made possible by the hollow profile according to the invention. Nevertheless, the closed hollow profile is more stable than an open hollow profile, so that additional stiffening measures can be dispensed with.

The term "cylindrical" here is not limited to cylinders having a circular cross-section, but also comprises bodies having other cross-sectional shapes, in accordance with the mathematical definition of a cylinder.

The substantially flat starting material of the hollow profile may, for example, be a sheet metal blank which can be brought into a cylindrical profile shape in a simple manner by bending. The material chosen here may be any bendable material, for example metals, metal-containing materials or a fiber composite material.

The mutually opposite lateral edges of the substantially flat starting material, which are brought into the vicinity of one another by the shaping, may be substantially parallel, i.e. they do not necessarily have to run in a straight line, but at an approximately constant distance from one another. To connect the lateral edges, it is sufficient for at least one projection to be formed on one of the lateral edges, which projection can engage in a corresponding receptacle of the respectively other lateral edge. Generally, however, it is advantageous to form a number of projections preferably on each of the lateral edges.

Thus, it may be provided that at least one tab-like projection is formed on each of the lateral edges and at least one corresponding receptacle is formed on the respectively other lateral edge, the projections being arranged offset from one another along the longitudinal axis of the hollow profile.

Furthermore, it may be provided that a corresponding receptacle for a projection of the first lateral edge is delimited in each case at least partially by two adjacent projections of the second lateral edge. In such an embodiment, a boundary of the receptacle is open on one side, namely at the place where an intermediate space is formed between the two adjacent projections. Even when these projections bear against one another, such an opening exists as a gap between the projections. Alternatively to this embodiment, the receptacle may also be formed as a slot, closed at the boundary, on the respectively other lateral edge, in which slot a tab-like projection of the opposite lateral edge of the hollow profile is received.

Irrespective of the configuration of the receptacle, a tab-like projection can engage in this receptacle in a clamping or positive locking manner. In a clamping variant, the respective tab-like projection is held non-positively in the corresponding receptacle by clamping forces. The required clamping forces may be formed, for example, between a projection and a receptacle if the projection is dimensioned slightly larger with respect to an external dimension (e.g. width) than the corresponding receptacle in which it is to be received (interference fit). In the positive locking variant, the tab-like projection has a form fit with the corresponding receptacle, which fit counteracts a pulling-out movement of the projection from the receptacle. For this purpose, the projection may, for example, have a hook-like shape with an engaging portion which can engage in a latching manner in the receptacle.

According to a second aspect, the object of the present invention is achieved by a frame piece for a rack, having a hollow profile which extends along its longitudinal axis and is brought into a cylindrical profile shape by shaping a substantially flat starting material, the hollow profile, on two opposite lateral edges, having a connecting region for closing the hollow profile. In contrast to the frame piece according to the first aspect, at least one tab-like projection is thus formed on each of the two lateral edges, which projection extends outwards from the respective lateral edge of the hollow profile, the at least two projections being arranged along the longitudinal axis of the hollow profile in each case with an offset from one another and being shaped such that they can be brought into engagement with a separately formed locking element in a clamping or positive manner.

According to the second aspect, the two lateral edges therefore do not cooperate directly with one another to close the hollow profile, but rather there is provided an additional, separately formed locking element which brings about a clamping or positive locking connection of the lateral edges together with the corresponding projections on the lateral edges of the hollow profile. In this embodiment, too, the use of a customary welding process for closing the hollow profile by means of material bonding can be dispensed with, thus eliminating the disadvantages associated therewith.

In principle, in each case one tab-like projection of a first lateral edge and one tab-like projection of a second lateral edge are connected to a separately formed locking element in a clamping or positive locking manner. Accordingly, a plurality of locking elements may also be provided for a plurality of pairs of tab-like projections of a respectively first and second lateral edge. Alternatively, however, a separately formed locking element may be brought into engagement with a plurality of or all projection pairs in a clamping or positive locking manner, so that these pairs bring about a releasable connection of the lateral edges together with the locking element.

Furthermore, it may be provided that at least two projections jointly form a receptacle for the locking element. In a development of this embodiment, the projections may be of sleeve-shaped form, with sleeves formed by the projections being arranged such that they are at least substantially aligned with one another in a closed position of the hollow profile. The aligned sleeves here form the receptacle for the locking element, which may, for example, be pushed into the receptacle.

The receptacle for the locking element may be formed partially or even completely in the interior of the hollow profile. Alternatively, the circumferential surface of the hollow profile may form a part of the receptacle. Here, that portion of the tab-like projections which connects the engaging portion to the respective lateral edge from which the projection extends outwards ("connecting portion") may form a plane surface or a lateral edge of the circumferential surface of the hollow profile. If a part of the receptacle is formed by the circumferential surface of the hollow profile, this has the advantage that material can be saved, resulting in both a cost reduction and a weight reduction of the hollow profiles. Alternatively, however, it may also be expedient for the receptacle to be completely or almost completely formed in the interior of the hollow profile.

Furthermore, the hollow profile may be of polygonal form in cross-section and the receptacle for the locking element may be formed on a corner of the hollow profile cross-section.

In an alternative embodiment, the locking element may have at least one receiving groove, extending in the longitudinal direction of the hollow profile, for the clamping or positive reception of at least one portion of the at least two projections. In this alternative embodiment, therefore, the projections do not form a receptacle for the locking element, but rather the locking element provides a receptacle for the projections. It is not necessary here for the projections to be completely received in the receiving groove, rather, for example, only the so-called engaging portion of each projection may be inserted into the receiving groove for the clamping and positive locking reception. Once the projections of a first and a second lateral edge of the hollow profile have been received in the receiving groove of the locking element in a clamping or positive locking manner, these are fixed in their position relative to one another, so that the lateral edges remain stably connected to one another. It may be expedient here in terms of production not to provide a receiving groove extending over the entire length of the locking element, but one or more groove portions extending in the longitudinal direction of the hollow profile.

Furthermore, the receiving groove has an undercut, in which the at least two projections are able to engage positively. Such an undercut may, for example, be of dovetailed, prismatic or conical form, when viewed in cross-section. The projections are in this case shaped such that they can engage by their engaging portion in the undercut region of the receiving groove. For this purpose, the projections are inserted at least by their engaging portion into the undercut groove and brought into a position in which their engaging portions or their engaging portion can cooperate with the undercut of the receiving groove, in order to retain them positively in the receiving groove, thereby establishing the connection of the lateral edges of the hollow profile.

Furthermore, the locking element may comprise a rod which runs parallel to the longitudinal axis of the hollow profile over substantially the entire length of the hollow profile. The rod may, for example, have exactly the same length as the associated hollow profile of a frame piece, but it may alternatively also be expedient for the rod to extend a little beyond the length of the first hollow profile or be formed a little shorter than the associated hollow profile, but nevertheless extend over most of the length of the hollow profile.

The design of the locking element as a rigid locking element in the form of a rod or as a bar or the like is particularly favorable for producing a defined position of the lateral edges with respect to one another and hence a clearly defined connection of the lateral edges. Alternatively, however, a design of the locking element as a flexible or (partially) elastic locking element may also be expedient, for example in the form of a rope or belt or the like.

The at least one projection may have at least one portion with a curvature or a sharp bend, when viewed in cross-section. Here, "when viewed in cross-section" means a view in which the hollow profile is cut in a plane perpendicular to its longitudinal axis.

A curved shape of the projection, when viewed in cross-section, comprises any form of the projections with a curvature which enables engaging-behind or engaging by the projections. As a sub-type of the curvature, the projections may also have a sharply bent shape, when viewed in cross-section, the difference from the aforementioned curvature consisting in a smaller radius of curvature.

Each projection may have a substantially T-shaped outer contour. Here, the vertical or longitudinal limb of the T-shaped outer contour extends from the lateral edge of the hollow profile and leads into the transverse limb, which forms at the same time the free end of the projection. Here, the entire T transverse limb of the respective projection may form an engaging portion, by which the projection can be brought into engagement with the corresponding receptacle of the respectively other lateral edge or with the locking element, while the connecting portion is formed by the T longitudinal limb. However, the engaging portion may also comprise a part of the longitudinal limb of the T-shaped projection as well, or be formed by only a part of the T transverse limb. The term "engaging portion" is therefore defined according to its function, which may comprise different portions of the projection, depending on the configuration of the projections.

In this configuration of the at least one projection, the receptacle may also correspond substantially to the outer contour of the projection to be received, in its flat state or in its shaped state (when the projection is curved or sharply bent, when viewed in cross-section), i.e. in the case of a T-shaped design of the projection of the first lateral edge, the corresponding receptacle on the second lateral edge may also be formed in the shape of a T complementary to the projections. In this likewise T-shaped receptacle, a T-shaped projection of the first lateral edge can then be releasably inserted. The projection of the first lateral edge may, for example, be hung into the corresponding receptacle of the second lateral edge, i.e. pushed by its free end into the corresponding receptacle and then displaced in a direction transversely to the longitudinal axis. The engaging portion thereby comes into a position in which its T transverse limb comes into positive locking engagement with the material, delimiting the receptacle, of the second lateral edge. This "hanging-in" mechanism of action may also be realized with differently shaped outer contours of the projection and corresponding recess which enable mutual engaging-behind of the projections or individual portions of the projections.

Alternatively, the at least one projection received in the receptacle may be bent such that its engaging portion and its connecting portion enclose a bending angle of approximately 180 degrees and clamp the material surrounding the receptacle of the second lateral edge between them. Bending the projection creates a stable connection and prevents the projection from being able to be pulled out of the receptacle again.

In one design variant in which a large number of projections are formed on the respective lateral edges of the hollow profile, a clamping may be effected by bending or shaping only at certain projections in the connecting region of the hollow profile or at all projections.

Furthermore, in all embodiments, the hollow profile may have on its circumferential surface a number of fastening recesses which are formed substantially as two partially overlapping openings. These may, for example, be formed and arranged symmetrically with respect to a central longitudinal axis of the lateral face of the hollow profile on which they are provided. The symmetry facilitates assembly considerably.

Finally, the hollow profile may be formed symmetrically in cross-section with respect to a diagonal axis intersecting the longitudinal axis. This measure also results in a symmetry of the hollow profile, which enables varied assembly of the frame profiles.

Preferred embodiments of the invention will be explained below with reference to the appended, schematic figures, in which:

FIG. 2 shows an isometric view of a hollow profile of a first embodiment of a frame piece according to the invention;

FIG. 3 shows a detail view of a connecting region of the hollow profile according to FIG. 2;

FIGS. 4a, 4b show sectional views of the connecting region along the section lines IVa-IVa and IVb-IVb from FIG. 3;

FIG. 5 shows an isometric view of a hollow profile of a second embodiment of a frame piece according to the invention;

FIG. 6 shows an isometric view of a hollow profile of a third embodiment of a frame piece according to the invention;

FIG. 7 shows an isometric view of a hollow profile of a fourth embodiment of a frame piece according to the invention, with a locking element connected to the hollow profile;

Figure 1:
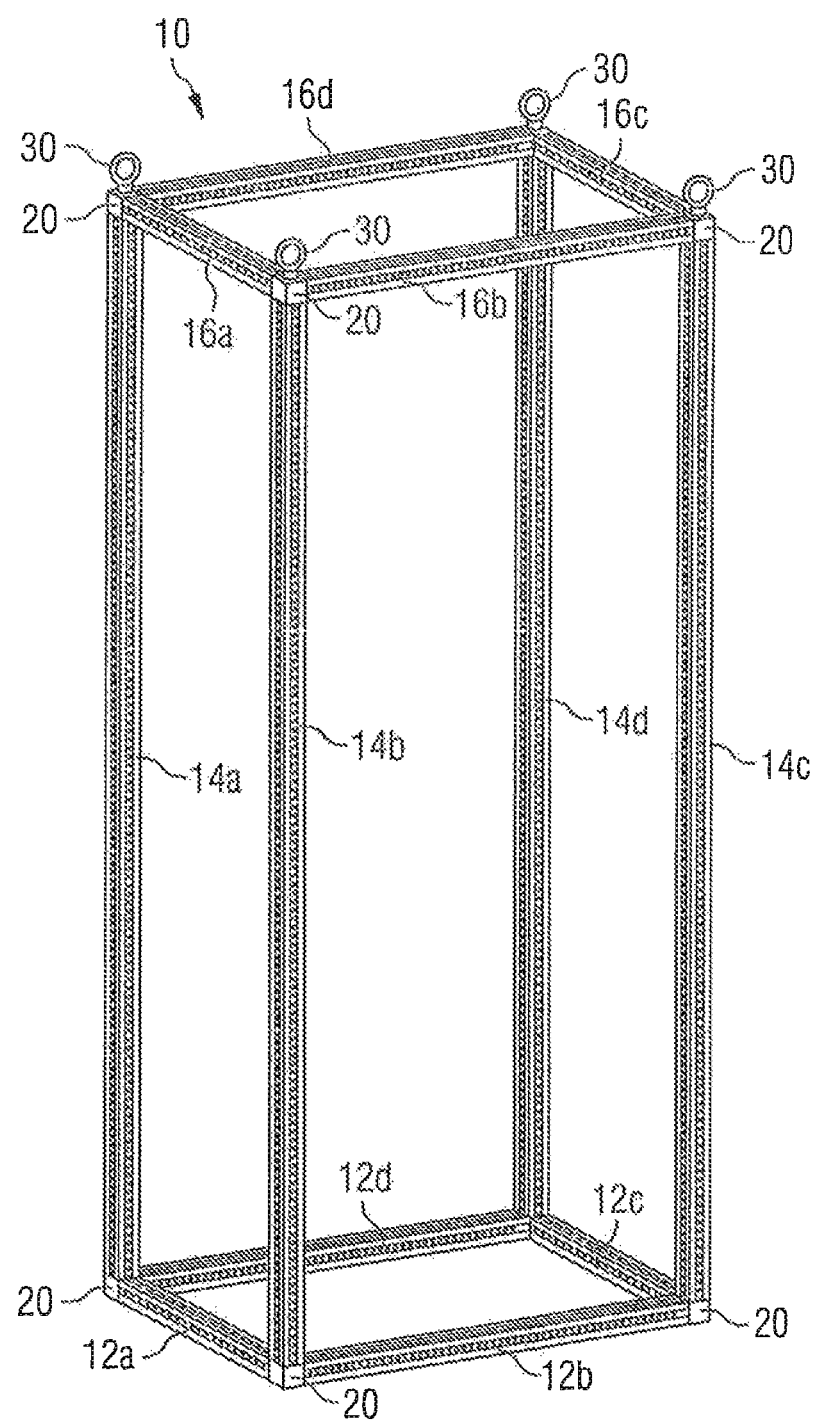
FIG. 1 shows an isometric representation of a rack in the form of a switchgear cabinet rack composed of a number of frame pieces according to the invention which are connected to one another.

FIG. 1 shows schematically a switchgear cabinet rack that is provided generally with the reference symbol 10. The switchgear cabinet rack 10 in the embodiment shown comprises four lower horizontal frame pieces 12a, 12b, 12c and 12d and four upper horizontal frame pieces 16a, 16b, 16c and 16d, each forming a rectangle, and four vertical frame pieces 14a, 14b, 14c and 14d, connecting the two rectangles. The frame pieces according to the invention are connected to one another in the corner regions of the switchgear cabinet rack by so-called corner connectors 20, with each two frame pieces which are connected to one another enclosing a right angle between them in the embodiment shown. The frame pieces are all formed from cylindrical hollow profiles 42, which will be described in more detail below, extending along a longitudinal axis L (cf. FIGS. 2 to 7).

Figure 8A:
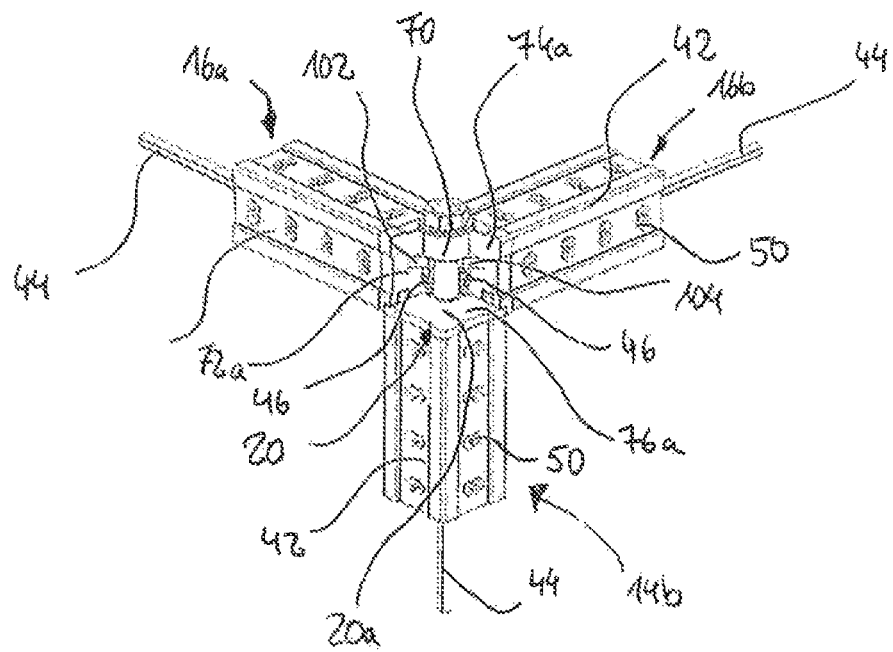
FIGS. 8a, 8b show detail views of the switchgear cabinet rack from FIG. 1 in two embodiments.
Figure 8B:
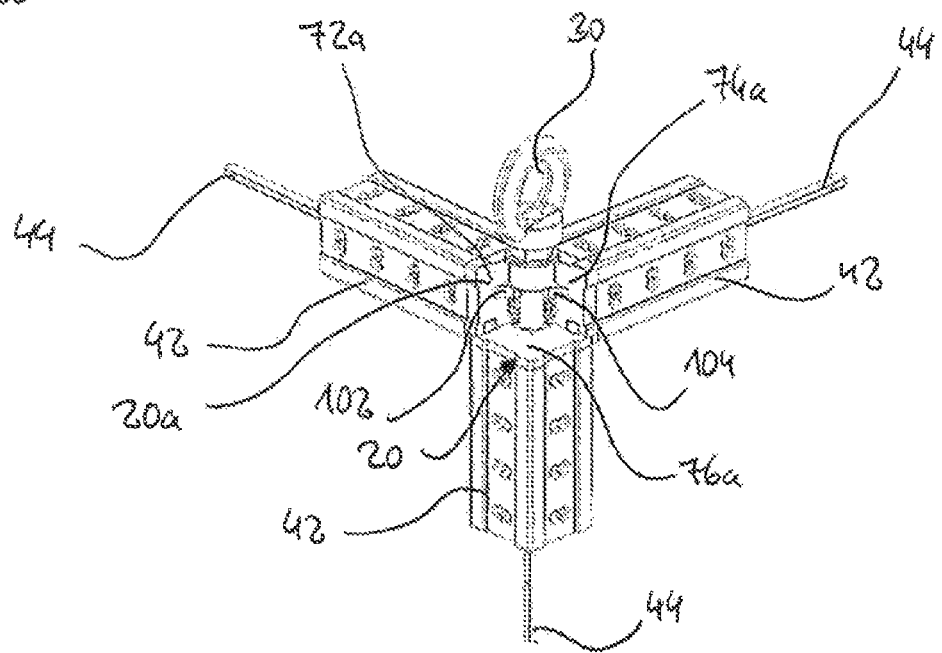

At the upper corner connectors 20 there can additionally be mounted crane eyes 30 or the like, which enable lifting and displacement of the switchgear cabinet rack 10 or the fully assembled switchgear cabinet with the aid of a crane (cf. also FIG. 8b).

FIGS. 2 to 7 show different embodiments of the hollow profile of a frame piece according to the present invention. A first embodiment is illustrated in FIGS. 2 to 4b, in which the hollow profile 42 is maintained in its closed profile shape in a connecting region 58. The hollow profile 42 extends, as do all the hollow profiles specified below, along a longitudinal axis L. The longitudinal axis may be the central longitudinal axis of the hollow profile or any other longitudinal axis running parallel to this axis. Hereinbelow, a direction running along the longitudinal axis L is referred to as the longitudinal direction (or "longitudinally").

Viewed in a cross-section perpendicular to the longitudinal axis, the hollow profile 42 according to the embodiment of FIGS. 2 to 4b is formed as a pentagonal hollow profile, with the connecting region 58 forming a fifth lateral face 32e of the hollow profile 42. Of the remaining four lateral faces 32a-d, each two opposite lateral faces are formed parallel to one another, namely the lateral faces 32a and 32c, and the lateral faces 32b and 32d.

Each of the lateral faces 32a-32d has an approximately centrally arranged region with a surface 52 which is recessed in relation to the outer circumference of the hollow profile 42 and extends likewise in the longitudinal direction. In the region of this recessed surface 52 there are arranged a number of fastening recesses 50 which are formed as overlapping double holes in the shape of an eight. The fastening recesses 50 serve for receiving fastening means, with the aid of which interior components can be mounted in the switchgear cabinet rack.

In this special design of the recesses 50 as a double hole, instead of a single fastening recess (cf. FIG. 6, reference symbol 250) symmetrical with respect to a central longitudinal axis $L_M$ of the associated lateral face 32a, two eccentric fastening recesses 50 symmetrical with respect to the central longitudinal axis $L_M$ are provided on each of the lateral faces 32a-d. These recesses may overlap, as shown in the figures, or be arranged spaced from one another. The symmetry of the fastening recesses with respect to the central longitudinal axis $L_M$ ensures that there is no preset upper or lower portion of the hollow profiles with respect to the installed situation of the interior components to be mounted in the switchgear cabinet rack.

The channel-shaped indentations, i.e. the surfaces 52 recessed in relation to the outer circumference of the hollow profile 42, in the lateral faces 32a, 32b, 32c and 32d can be produced during the shaping process of the hollow profile 42, for example by bending, and they contribute to the stiffening of the hollow profile 42.

In the manufacture of a hollow profile 42 for a frame piece, a substantially flat starting material, e.g. a sheet metal blank, is brought by shaping, for example bending, into a profile shape which is subsequently intended to form the closed hollow profile. Here, two substantially parallel, opposite lateral edges of the flat basic material adjoin one another in a connecting region 58. These lateral edges are indicated by the dashed lines 18 and 22.

In the region of the lateral edges 18, 22 there are formed in each case a plurality of projections 54, 56 which are arranged along the longitudinal axis L with an offset from one another such that a projection 54 of a first lateral edge 18 can engage in each case into the intermediate space formed between two projections 56 of the second lateral edge 22, and vice versa. The adjacent projections of a first lateral edge therefore delimit—at least in the longitudinal direction L of the hollow profile 42—a receptacle for a projection of the respectively second lateral edge.

The projections 54, 56 have substantially the same tab-like shape, there being provided in the region of their free end an engaging portion 24 which is connected by a connecting portion 26 to the respective lateral edge 18 or 22. Each of the projections 54, 56 is bent during the shaping process such that the connecting portion 26 has a substantially longitudinally running bending radius at the transition to the engaging portion 24.

When the hollow profile 42 is closed, the connecting portions 26 of the projections 54 and 56 all lie in one plane in the connecting region 58 and form the lateral face 32e, as shown in FIG. 2. Each engaging portion 24 is inclined at an angle of more than 0 degrees and less than 180 degrees, preferably approximately 90 degrees, in relation to the associated connecting portion 26.

The projections 54, 56 are of T-shaped form, with the connecting portion 26 forming the T body (T longitudinal bar), which perpendicularly meets the engaging portion 24 (T crossbar) running transversely thereto. In the transition region from the lateral edge 18 or 22 to the connecting region 26, i.e. at the foot of each T-shaped projection, there are additionally provided two lateral notches 28 which locally reduce the connecting portion 26.

As already indicated above, two connecting regions 26, lying in the plane of the lateral face 32e, of the projections 54 of a lateral edge 18 delimit, together with the lateral edge 18 from which they extend outwards, in each case an intermediate space for receiving a projection 56 of the respectively other lateral edge 22. This intermediate space or this receptacle has a shape corresponding substantially to the projection 56 to be received. Here, the lateral notches 28 in the foot region of two adjacent connecting regions 26 form a slot-shaped receiving region 28a, which corresponds in its longitudinal extent to the longitudinal extent of the engaging portion 24 of a projection, or is of sufficient size to receive the engaging portion 24. This first slot-shaped receiving region 28a merges into a second receiving region 28b, which corresponds in its longitudinal extent to the longitudinal extent of the connecting region 26 of a projection, or is of sufficient size to receive this connecting region.

Since the first slot-shaped receiving region 28a has a width b (cf. FIG. 3) which is less than the width B of the engaging portion 24 of a projection, the engaging portion 24 can be passed through the first slot-shaped receiving region 28a only in a state in which it is somewhat curved in the insertion plane, in order to be hung into the receptacle between two projections of the respectively other lateral edge.

In another embodiment (not illustrated), the hanging-in can be achieved by the engaging portion 24 being inserted from outside through the slot-shaped receiving region 28a into the interior of the hollow profile and, in a movement direction in which the lateral edges 18 and 22 are moved away from one another, sliding along on the inner side of the hollow profile until it comes into engagement with an engaging portion of the respectively opposite projection. As long as the lateral edges are maintained in a position in which the engaging portion cannot be pulled out of the cutout through the slot-shaped cutout region again, the connection between the lateral edges is preserved. This may be achieved, for example, by the hollow profile being fitted onto a projection or the like, the outer contour of which keeps the lateral edges in the connecting region under tensile stress at a predetermined distance from one another, so that a movement of the projections out of the corresponding cutouts is not possible.

Alternatively, as shown in the embodiment of FIGS. 2 to 4b, a securing may also be formed by the engaging portions 24, as soon as they are inserted into the corresponding cutouts 28a, being bent such that they counteract a pulling-out movement from the cutout 28a. This can be achieved, for example, by the engaging portion 24 and the associated connecting portion 26 enclosing a bending angle of 180 degrees between them, as shown in FIGS. 4a and 4b. Since the width B of the engaging portion 24 is greater than the width b of the slot-shaped receiving region 28a, the bent engaging portion can no longer be pulled out of the cutout. The hung-in projections 54 and 56 also block one another in that the engaging portion 24 of one projection of a first lateral edge in each case engages under or engages behind the connecting portion of one projection of the respectively other lateral edge (cf. FIGS. 4a and 4b). In this way, a secure connection of the lateral edges of a hollow profile to form a closed hollow profile is now achieved with the projections 54 and 56 of the two lateral edges 18 and 22.

FIGS. 5 to 7 show further embodiments of a hollow profile of a frame piece according to the invention, according to a second aspect of the invention. In these alternative design variants, like elements and features of a hollow profile are provided with the same reference symbols, but with those in the second embodiment of FIG. 5 being prefixed with the numeral "1", those in the third embodiment of FIG. 6 with the numeral "2" and those in the fourth embodiment of FIG. 7 with the numeral "3".

In contrast to the first embodiment of FIGS. 2 to 4b, the hollow profile 142 is of square design in cross-section, with the lateral edges of the lateral faces 132a, 132b, 132c and 132d being of substantially equal length and the mutually opposite sides 132a and 132c, and 132c and 132d, being parallel to one another. The tab-like projections 154, 156 which project from the lateral edges 118 and 122 in a connecting region 158 are furthermore shaped into sleeves. In a closed position of the hollow profile 142, as shown in FIG. 5, the sleeves shaped by the projections 154 and 156 are aligned with one another such that jointly they form a receptacle (leadthrough) 148 for a locking element. Here, the projections 154, 156 are shaped, for example by bending, in such a manner that a part (connecting portion 126) of each projection 154, 156 furthermore also forms a part of the circumferential surface of the cylindrical hollow profile 142.

In this embodiment too, the projections 154 and 156 are arranged with an offset from one another along the longitudinal axis L, so that a projection 154 of the first lateral edge 118 engages in the intermediate space formed between two projections 156 of the second lateral edge 122, and vice versa. Thus, the projections 154, 156, in particular their connecting portions 126, adjoin one another flush when viewed in the direction of the longitudinal axis L, with the result that a smooth lateral edge of the hollow profile 142 in the connecting region 158 is produced. The engaging portions 124 of the projections 154, 156, by contrast, serve to come into engagement with a separately formed locking element, as explained below with reference to FIG. 7.

FIG. 6 shows a modification in which the lateral edges 218 and 222 bear against one another, and the projections have been bent into the interior of the hollow profile 242 such that the entire receptacle 248, into which likewise a separate locking element can be inserted for connecting the lateral edges 218 and 222, is arranged in the interior of the hollow profile 242. Furthermore, on two lateral faces 232c and 232d there are additionally formed grooves 260 which likewise extend in the longitudinal direction of the hollow profile 242 and may serve for receiving a sealing element for example.

In the embodiment shown in FIG. 7, the receptacle 348 is likewise formed completely in the interior of the hollow profile 342. Furthermore, the individual projections 354 and 356 are shaped such that, when viewed in cross-section, they are of hook-shaped form and do not, as in FIG. 5, form sleeve-shaped closed receiving regions. Instead, the free end of the respective projection 354 and 356 is arranged at a distance from the connecting portion 326. Here, it is sufficient for the projections 354 and 356 to be shaped such that they are suitable for receiving a locking element 344 between them and are supported thereon such that a releasing movement of the lateral edges 318 and 322 away from one another is blocked.

In the illustrated embodiment of FIG. 7, the locking element 344 is formed as a threaded rod with an externally threaded portion 344a extending over the entire length of the threaded rod 344. Furthermore, two oppositely arranged portions 344b are formed on the locking element 344, which likewise extend along the longitudinal axis L and have no thread. The latter portions facilitate, if necessary, the insertion of the locking element 344. As soon as the locking element 344 has been inserted into the receptacle 348 of the hollow profile 342, it can be secured at each of its ends by a respective nut 346 against a pulling-out movement in the longitudinal direction.

The hollow profiles 142, 242, 342 of FIGS. 5 to 7, like the hollow profiles of FIGS. 2 to 4b, are all brought into their desired shape by a shaping process, for example by bending or stamping and bending, with the fastening receptacles 150, 250, 350 additionally having a reinforcing circumferential collar 150a, 250a, 350a projecting into the interior of the hollow profile.

As shown in FIGS. 8a and 8b, the locking element 344 can furthermore cooperate together with further elements of a switchgear cabinet rack in the manner of a tensioning unit 340, as will be described below.

Common to all embodiments of a hollow profile of a frame piece according to the invention is an axially symmetrical design in cross-section, with the axis of symmetry being formed by a diagonal D intersecting the central longitudinal axis. This symmetrical property of the hollow profiles ensures that there is no preset upper or lower portion of the hollow profiles with respect to the installed situation, thereby simplifying the assembly of the switchgear cabinet rack considerably.

FIGS. 8a and 8b show how three frame pieces 16a, 16b and 14b are connected by means of a corner connector 20 and three tensioning units 40 assigned to the frame pieces. Here, it is advantageous for all the frame pieces of the switchgear cabinet rack 10 to have an identical profile cross-section, since the manufacturing costs can be reduced if the individual frame pieces have only to be cut to the desired length from an extruded section of a preshaped hollow profile.

The corner connector 20, of which only a first part 20a is shown in FIGS. 8a and 8b, has three wall portions 72a, 74a and 76a, against which the frame pieces 16a, 16b and 14b to be connected bear at their end face. Additionally, the corner connector may have on each of its wall portions 72a, 74a and 76a a projection 82, 84 and 86 (cf. FIG. 9a) or the like which extends in the direction towards the frame piece to be connected and onto which the hollow profile of the frame piece to be connected can be fitted (in FIG. 8a, hollow profile portions 42 fitted onto the projections 82 and 84 are illustrated).

Furthermore, the corner connector 20 has through-bores 78 which are formed in the region of each wall portion 72a, 74a, 76a and through which the locking elements 44 of the respective frame piece 16a, 16b, 14b can extend. The through-bores 78 may extend through the projections 82, 84 and 86. Alternatively, the projections may be arranged with an offset from the through-bores.

A force transmitting member (limiting member) having a larger outside diameter than the through-bore 78 can then be mounted, on the locking element extending through the through-bore 78, from a side of the respective wall portion opposite the frame piece. In the case of a locking element formed as a threaded rod 44, the force transmitting member can, as shown in FIG. 7, be a nut 46 which is screwed onto the external thread 44a of the threaded rod 44. With the aid of the nut 46, the threaded rod 44 is prevented from being pulled out through the through-bore 78, so that the locking element is fixed on one side. The same is achieved, at the respectively other end of the frame pieces to be connected, likewise with a limiting member (mirror-inverted embodiment) or by a direct connection of the locking element to a frame piece or corner connector.

Thus, in a mirror-inverted embodiment, one frame piece and two wall portions of a corner connector are arranged in each case between two nuts. In addition to the above-explained blocking of the locking element 44 in the receptacle 48 of the hollow profile 42, with the aid of the nuts 46 a bracing of the components arranged between these nuts can be achieved by the effective length of the locking element 44 being shortened, for example, by a screwing movement of the nuts 46 towards one another. If the frame pieces of a switchgear cabinet rack 10 are braced in this manner at the end faces in each case against two corner connectors 20, on these a connection of the frame pieces via the corner connectors 20 to form a rack 10 is achieved. Alternatively, a bracing of the frame pieces against one another without the interposition of corner connectors would also be conceivable.

This effect of a bracing may, however, be produced not only with the aid of a locking element formed as a threaded rod and two limiting members formed as nuts. For instance, the locking element may also be formed as a tensioning belt, tensioning wire or the like and cooperate with a clip or the like as limiting member in the manner described above. Moreover, a limiting member may also be formed integrally on the locking element or on the corner connector or frame piece which is to be connected. Thus, for example, the locking element may be fastened directly (e.g. with a knot) to the corner connector or to a separate limiting member. Furthermore, the locking element may be partially of rigid form and for example have projections (latching lugs) which cooperate with corresponding latching lugs or a correspondingly shaped receptacle in such a manner that passing through is possible in only one direction (cable tie principle). Provision may also be made for recesses on the locking element, into which a clamping body (as locking means), such as e.g. a clamping sleeve, can be inserted in order to counteract a pulling-out movement of the locking element from the through-bore of the corner connector etc.

Figure 9A:
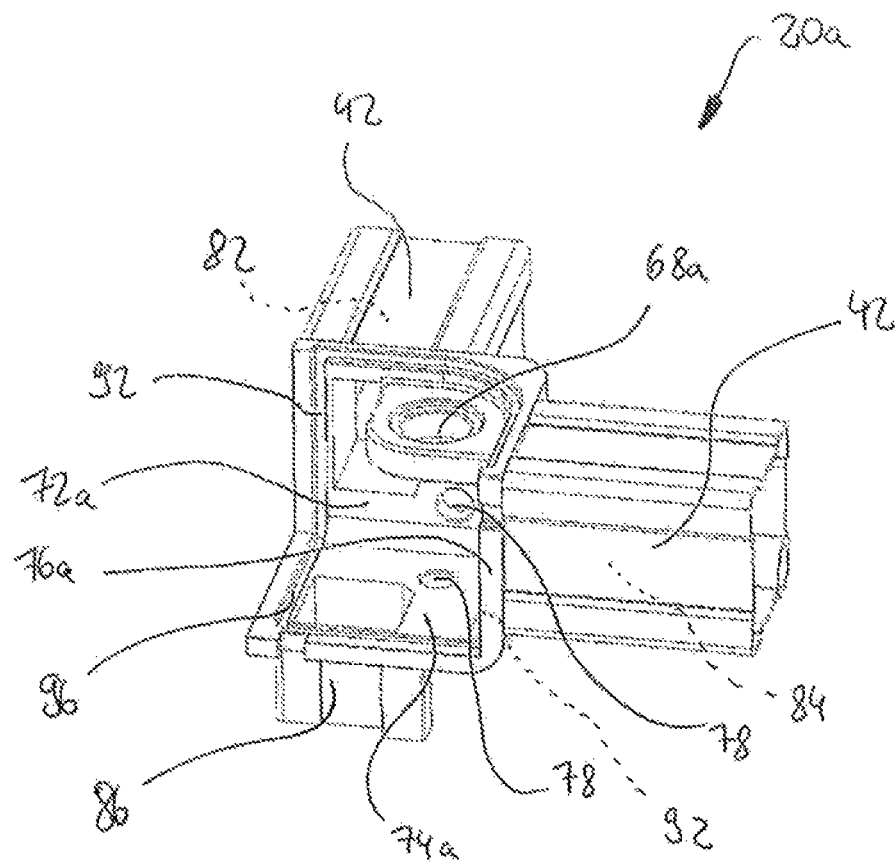
FIGS. 9a-9c show isometric views of the components of a corner connector for receiving the frame pieces according to the invention.
Figure 9B:
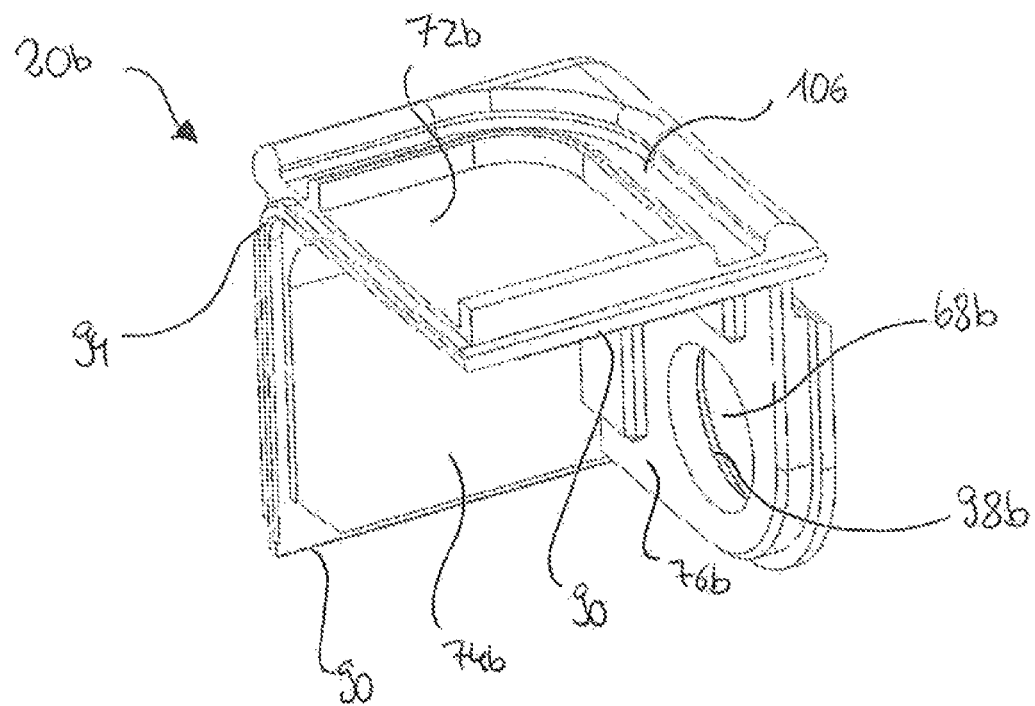

As already indicated above, the corner connector 20 is formed of two parts here (cf. FIGS. 9a and 9b). The second part 20b of the corner connector 20 corresponds in its construction substantially to the first part 20a with three wall portions 72b, 74b, 76b substantially perpendicular to one another. In the assembled state, the wall portions 72a, 74a and 76a of the first part 20a and the wall portions 72b, 74b, 76b of the second part 20b delimit a cuboid-shaped inner cavity.

On the outer wall portions 72b, 74b, 76b, however, in contrast to the first part 20a, the second part 20b has no projections for connection to frame pieces. Instead, a groove 106 open towards the outer side may be arranged at least on an outer wall portion 72b, which groove in the assembled state is aligned with corresponding receiving grooves (cf. FIG. 6, grooves 260) on the connected frame pieces and may serve for receiving a sealing element.

Figure 9C:
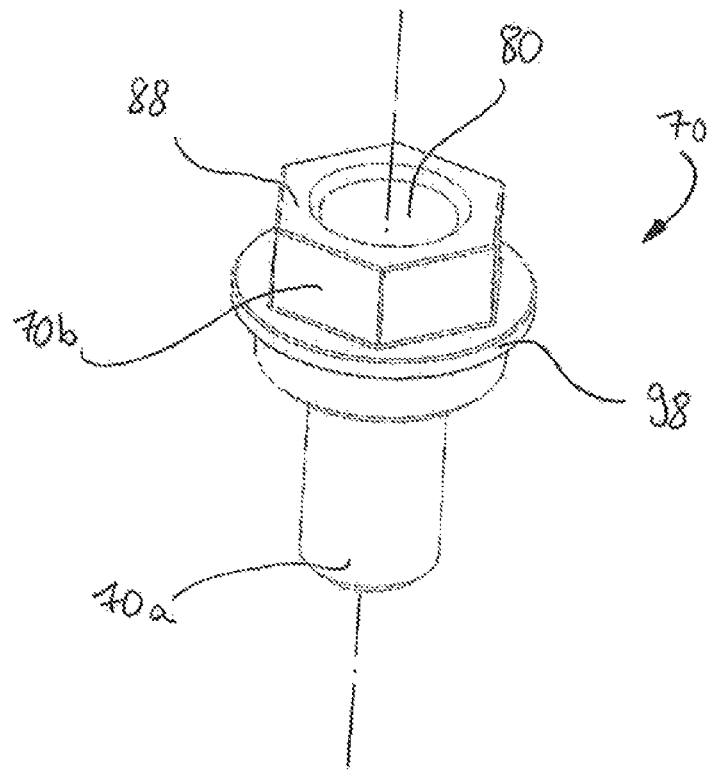

In order to connect the two parts 20a and 20b of the corner connector 20 to one another, a separate clamping screw or the like may be used. It may, however, also be particularly advantageous, as shown in FIGS. 8a and 8b, to utilise one of the locking elements, designed as a threaded rod, for this purpose. In this embodiment, a specially formed limiting member 70 (cf. also FIG. 9c) is screwed onto the external thread 44a of the threaded rod 44 from outside. For this purpose, the second part 20b of the corner connector 20 has on a wall portion 76b a fastening opening 68b aligned with the through-bore 78 of the first part 20a. The limiting member 70 is put onto the threaded rod 44 through this opening. The limiting member 70 has for this purpose at its first end 70a an inner bore (not illustrated) with an internal thread which can be screwed onto the threaded rod 44. In addition, as shown in FIG. 9c, a bore may also be formed at the opposite second end 70b of the limiting member 70, which bore likewise has an internal thread and thus enables, for example, a crane eye 30 to be screwed into it. To simplify the manufacture of the limiting member 70, both bores may be formed as one through-bore 80 with an internal thread (not illustrated).

At its end 70b, the limiting member 70 further has a screw head 88 (usually formed as a hexagon) with a collar 98. The screw head 88 is shaped such that a fitter with a corresponding tool can rotate the limiting member 70 in the desired direction until the collar comes to bear against the outer surface of the wall portion 76b or an indentation 98b surrounding the fastening opening 68b and in this way clamps the first part 20a to the second part 20b.

The assembly of the switchgear cabinet rack 10 is described below with reference to the figures taking one corner connector 20 as an example: In a first step, the frame pieces are fitted onto the projections 82, 84, 86 of the corner connector 20 such that the leadthrough 48 of each frame piece is aligned with the through-bores 78 on the corner connector 20. Then, the threaded rod 44 of each frame piece is inserted into the leadthrough 48 of the hollow profile 42 to such an extent until a free end of the threaded rod 44 extends through the respective through-bore 78 of the corner connector 20 onto the opposite side of the respective wall portion.

The threaded rod 44 inserted into the receptacle or leadthrough 48, already in this position, keeps the lateral edges of the hollow profile connected.

In a further step, the nuts 46 are screwed onto the free end of the threaded rods 44 of the frame pieces 16a and 16b, so that the threaded rods 44 can no longer be pulled through the through-bores 78 in the direction towards the projection on which the frame piece is fitted. As soon as both force transmitting members assigned to one locking element are engaged therewith and are supported on the components to be braced, the tensioning force can be adjusted by adjusting the screwing depth. With the aid of the nuts 46, on the one hand the threaded rod is thus fixed in its position relative to the hollow profile and on the other hand a pretensioning of the components received between the nuts 46 is achieved, which enables a connection of the components of the switchgear cabinet rack.

Subsequently, the second part 20b of the corner connector 20 is connected to the first part 20a. For this purpose, the second part 20b is inserted by its guide edges 90 into corresponding guide rails 92 and pushed to such an extent into the first part 20a until its guide edge 94 engages in the guide rail 96 of the first part 20a. In this position, the opening 68b is aligned with the through-bore 78, through which the threaded rod 44 of the frame piece 14b extends.

To stabilise the wall portion 76b of the second part 20b, the first part 20a, as shown in FIG. 9a, is provided with a supporting surface 100 having a corresponding fastening opening 68a which is likewise aligned with the fastening opening 68b of the second part 20b. An alternative configuration is shown in FIGS. 8a and 8b, in which supporting lugs 102, 104 project from the inner surfaces of the wall portions 72a, 74a in the direction towards the cavity formed by the parts 20a, 20b of the corner connector 20.

Now, the limiting member 70 (cf. also FIG. 9c) is screwed onto the external thread 44a of the threaded rod 44 from outside to such an extent in the direction towards the frame piece 14b until the collar 98 comes to bear against the outer surface of the wall portion 76b or an indentation surrounding the fastening opening 68b and in this way on one side clamps the first part 20a to the second part 20b and also the frame piece 16b to the corner connector 20.

In addition, a crane eye 30 may be screwed into the inner bore 80 of the screw head 88.

The invention claimed is:

1. A frame piece for a rack, comprising:
a hollow profile which extends along its longitudinal axis and is brought into a cylindrical profile shape by shaping a substantially flat starting material, the hollow profile, on two opposite lateral edges, having a connecting region for closing the hollow profile; and
a plurality of tab-like projections being formed on each of the lateral edges and at least one corresponding receptacle being formed on the respectively other lateral edge, the plurality of tab-like projections being arranged offset from one another along the longitudinal axis of the hollow profile, wherein each of the plurality of tab-like projections extends outwards from the lateral edge of the hollow profile and is shaped such that it can be brought into engagement with at least one corresponding receptacle on the respectively other lateral edge in a clamping or positive manner, each of the plurality of tab-like projections includes an engaging portion and a connecting portion, wherein the connecting portion connects the engaging portion to the respective lateral edge of the hollow profile, and a distal end of the engaging portion is bent back such that the engaging portion extends toward the connecting portion such that the distal end of the engaging portion is substantially parallel to the connecting portion,
wherein a corresponding receptacle for a projection of the first lateral edge is delimited in each case at least partially by two adjacent projections of the second lateral edge.

2. A frame piece for a rack, comprising:
a hollow profile which extends along a longitudinal axis and is brought into a cylindrical profile shape by shaping a substantially flat starting material, the hollow profile, on two opposite lateral edges, having a connecting region for closing the hollow profile; and
a plurality of tab-like projections being formed on each of the lateral edges and at least one corresponding receptacle being formed on the respectively other lateral edge, the projections being arranged offset from one another along the longitudinal axis of the hollow profile, each of the plurality of tab-like projections extends outwards from the lateral edge of the hollow profile and is shaped such that it is brought into engagement with at least one corresponding receptacle on the respectively other lateral edge in a positive manner,
wherein the corresponding receptacle for a projection of the first lateral edge is delimited in each case at least partially by two adjacent projections of the second lateral edge, and
wherein, for each of the plurality of tab-like projections and corresponding receptacle, each of the plurality of tab-like projections forms a hook-like shape with a distal end of an engaging portion extending toward a connecting portion such that the distal end of the engaging portion is bent back substantially parallel to the connecting portion, the engaging portion having a first width, the opposing receptacle defining a slot having a second width less than the first width and a longitudinal extent of sufficient size for receiving the distal end of the engaging portion of the corresponding tab-like projection, and the distal end of the engaging portion passes through the corresponding slot defined in the opposing receptacle in a latching manner.

3. A frame piece for a rack, comprising:
a hollow profile which extends along a longitudinal axis and is brought into a cylindrical profile shape by shaping a substantially flat starting material, the hollow profile, on two opposite lateral edges, having a connecting region for closing the hollow profile; and
a plurality of tab-like projections being formed on each of the lateral edges and at least one corresponding receptacle being formed on the respectively other lateral edge, the plurality of tab-like projections being arranged offset from one another along the longitudinal axis of the hollow profile, each of the plurality of tab-like projections extends outwards from the lateral edge of the hollow profile and is shaped such that it is brought into engagement with at least one corresponding receptacle on the respectively other lateral edge in a positive manner, each of the plurality of tab-like projections including an engaging portion and a connecting portion, where a distal end of the engaging portion is curved to extend toward the connecting portion such that the distal end of the engaging portion is substantially parallel to the connecting portion,
wherein the corresponding receptacle for a projection of the first lateral edge is delimited in each case at least partially by two adjacent projections of the second lateral edge, and
wherein each of the plurality of tab-like projections is dimensioned slightly larger with respect to an external dimension of the corresponding receptacle in which it is to be received and thereby forms an interference fit therebetween, such that the respective tab-like projection is held in the corresponding receptacle by clamping forces formed between the tab-like projection and the receptacle.

4. The frame piece according to claim 2, wherein the engaging portions of each of the plurality of tab-like projections is bent back at an angle of 180 degrees such that the engaging portions lie substantially co-planar when so latched.

5. The frame piece according to claim 1, wherein each of the plurality of tab-like projections is sharply bent, or curved, at least in one portion, when viewed in cross-section.

6. The frame piece according to claim 1, wherein each of the plurality of tab-like projections has a substantially T-shaped outer contour.

7. The frame piece according to claim 1, wherein the hollow profile has on its circumferential surface a number of fastening receptacles which are formed substantially as two partially overlapping openings.

* * * * *